(12) United States Patent
Xiang et al.

(10) Patent No.: US 11,215,863 B2
(45) Date of Patent: Jan. 4, 2022

(54) LIGHT MODULATING ELEMENT, BACKLIGHT MODULE, DISPLAY DEVICE AND METHOD FOR DRIVING THE SAME

(71) Applicants: BEIJING BOE OPTOELECTRONICS TECHNOLOGY CO., LTD., Beijing (CN); BOE TECHNOLOGY GROUP CO., LTD., Beijing (CN)

(72) Inventors: Desheng Xiang, Beijing (CN); Jianye Tang, Beijing (CN); Dawei Wang, Beijing (CN); Jiaqiang Wang, Beijing (CN); Dong Wang, Beijing (CN); Yanming Wang, Beijing (CN); Shuainan Liu, Beijing (CN); Yajun Guo, Beijing (CN); Xi Chen, Beijing (CN)

(73) Assignees: BEIJING BOE OPTOELECTRONICS TECHNOLOGY CO., LTD., Beijing (CN); BOE TECHNOLOGY GROUP CO., LTD., Beijing (CN)

( * ) Notice: Subject to any disclaimer, the term of this patent is extended or adjusted under 35 U.S.C. 154(b) by 0 days.

(21) Appl. No.: 16/701,540

(22) Filed: Dec. 3, 2019

(65) Prior Publication Data
US 2020/0271967 A1    Aug. 27, 2020

(30) Foreign Application Priority Data
Feb. 25, 2019   (CN) .......................... 201910136993.8

(51) Int. Cl.
*G02F 1/1334* (2006.01)
*G02F 1/1343* (2006.01)
(Continued)

(52) U.S. Cl.
CPC .......... *G02F 1/1334* (2013.01); *G02B 6/005* (2013.01); *G02F 1/1368* (2013.01);
(Continued)

(58) Field of Classification Search
None
See application file for complete search history.

(56) References Cited

U.S. PATENT DOCUMENTS

| | | | |
|---|---|---|---|
| 6,618,104 | B1 | 9/2003 | Date et al. |
| 6,836,314 | B2 | 12/2004 | Date et al. |

(Continued)

FOREIGN PATENT DOCUMENTS

| | | |
|---|---|---|
| CN | 105954913 A | 9/2016 |
| CN | 106782382 A | 5/2017 |

(Continued)

OTHER PUBLICATIONS

First Office Action, including Search Report, for Chinese Patent Application No. 201910136993.8, dated Apr. 2, 2021, 18 pages.

*Primary Examiner* — Dorothy Harris
(74) *Attorney, Agent, or Firm* — Westman, Champlin & Koehler, P.A.

(57) ABSTRACT

A light-modulating element, a backlight module, a display device and a method for controlling the same are provided. The light-modulating element includes a first substrate and a second substrate arranged opposite to each other, and a polymer dispersed liquid crystal layer located between the first substrate and the second substrate. The light-modulating element is divided into a plurality of light-modulating zones, and the light-modulating element further includes a first electrode and a second electrode located in each of the plurality of light-modulating zone. A plurality of first electrodes located in different light-modulating zones are independently arranged, and the first electrode and the second
(Continued)

electrode are configured to drive a deflection of polymer dispersed liquid crystal molecules in polymer dispersed liquid crystal layer.

20 Claims, 6 Drawing Sheets

(51) Int. Cl.
*G02F 1/1333* (2006.01)
*G02F 1/1335* (2006.01)
*G02F 1/1368* (2006.01)
*G09G 3/34* (2006.01)
*G09G 3/36* (2006.01)
*G02F 1/1347* (2006.01)
*F21V 8/00* (2006.01)

(52) U.S. Cl.
CPC .... *G02F 1/13476* (2013.01); *G02F 1/133305* (2013.01); *G02F 1/133504* (2013.01); *G02F 1/133512* (2013.01); *G02F 1/134309* (2013.01); *G09G 3/3406* (2013.01); *G09G 3/36* (2013.01); *G02F 1/133565* (2021.01); *G09G 2320/02* (2013.01); *G09G 2320/066* (2013.01)

(56) References Cited

U.S. PATENT DOCUMENTS

| | | | |
|---|---|---|---|
| 9,513,487 B2* | 12/2016 | Shinkai | G02B 6/0043 |
| 9,983,437 B2* | 5/2018 | Okuyama | G02F 1/133553 |
| 10,649,266 B2 | 5/2020 | Cheng | |
| 10,969,624 B2 | 4/2021 | Wang et al. | |
| 2002/0113920 A1* | 8/2002 | Kubota | G02F 1/134363 |
| | | | 349/86 |
| 2003/0134460 A1* | 7/2003 | Forbes | H01L 29/78669 |
| | | | 438/158 |
| 2004/0095524 A1 | 5/2004 | Date et al. | |
| 2006/0127665 A1* | 6/2006 | Masutani | G02F 1/133553 |
| | | | 428/323 |
| 2006/0267905 A1* | 11/2006 | Nishino | G09G 3/3648 |
| | | | 345/98 |
| 2008/0303988 A1* | 12/2008 | Matsushima | G02F 1/133634 |
| | | | 349/96 |
| 2009/0034868 A1* | 2/2009 | Rempel | G09G 3/3426 |
| | | | 382/264 |
| 2009/0174730 A1* | 7/2009 | Huang | G09G 3/3413 |
| | | | 345/690 |
| 2009/0195717 A1* | 8/2009 | Kabe | G02F 1/133753 |
| | | | 349/33 |
| 2010/0165450 A1* | 7/2010 | Okuyama | G02F 1/133615 |
| | | | 359/315 |
| 2012/0212523 A1* | 8/2012 | Yamauchi | G03B 21/60 |
| | | | 345/697 |
| 2012/0224121 A1* | 9/2012 | Gilbert | G09G 3/3426 |
| | | | 349/64 |
| 2013/0188100 A1* | 7/2013 | Ikuta | F21V 7/04 |
| | | | 348/739 |
| 2013/0196565 A1* | 8/2013 | Miyake | G02F 1/133788 |
| | | | 445/25 |
| 2013/0342772 A1* | 12/2013 | Lim | G02F 1/1334 |
| | | | 349/33 |
| 2014/0300528 A1* | 10/2014 | Ebisui | G02F 1/133615 |
| | | | 345/32 |
| 2015/0271482 A1* | 9/2015 | Chen | G02F 1/134309 |
| | | | 349/65 |
| 2016/0298035 A1* | 10/2016 | Fujisawa | C08F 220/286 |
| 2017/0219840 A1* | 8/2017 | Okuyama | G02F 1/137 |
| 2018/0004017 A1* | 1/2018 | Hatsumi | G02F 1/0045 |
| 2018/0217420 A1 | 8/2018 | Cheng | |
| 2019/0113796 A1* | 4/2019 | Jin | G02F 1/133308 |
| 2020/0301204 A1 | 9/2020 | Wang et al. | |

FOREIGN PATENT DOCUMENTS

| | | |
|---|---|---|
| CN | 107132697 A | 9/2017 |
| EP | 0977077 A2 | 2/2000 |
| WO | 2009081771 A1 | 7/2009 |

* cited by examiner

FPC

LIGHT MODULATING ELEMENT, BACKLIGHT MODULE, DISPLAY DEVICE AND METHOD FOR DRIVING THE SAME

CROSS-REFERENCE TO RELATED APPLICATION

This application claims a priority to Chinese Patent Application No. 201910136993.8 filed on Feb. 25, 2019, the disclosure of which is incorporated in its entirety by reference herein.

TECHNICAL FIELD

The present disclosure relates to the field of display technology, in particular, to a light-modulating element, a backlight module, a display device, and a method for driving the display device.

BACKGROUND

High-Dynamic Range (HDR) images may provide a wider dynamic range and more image details, and better reflect the visual effects of human real environment with respect to normal images. Therefore, high resolution rate and HDR are development hotspots of current display technologies.

In the related art, the HDR liquid crystal display adopts a backlight module of a direct-lit architecture, and adjusts the contrast between brightness and darkness in locally different regions by controlling the brightness of the light-emitting diodes (LED) in different regions of the BLU. HDR liquid crystal displays that use light-emitting diodes for light-modulating have some drawbacks.

SUMMARY

In a first aspect, an embodiment of the present disclosure provides a light-modulating element, which includes a first substrate and a second substrate arranged opposite to each other, and a polymer dispersed liquid crystal layer located between the first substrate and the second substrate. The light-modulating element is divided into a plurality of light-modulating zones. The light-modulating element further includes a first electrode and a second electrode located in each of the plurality of light-modulating zone. A plurality of first electrodes located in different light-modulating zones are independently arranged. The first electrode and the second electrode are configured to drive a deflection of polymer dispersed liquid crystal molecules in polymer dispersed liquid crystal layer.

In some optional embodiments, the first substrate and the second substrate each is made of polyimide PI.

In some optional embodiments, the first electrode includes a plurality of first strip sub-electrodes, and the second electrode includes a plurality of second strip sub-electrodes, the plurality of first strip sub-electrodes and the plurality of second strip sub-electrodes are made of a same material and arranged in a same layer, a plurality of first strip sub-electrode of the first electrode and a plurality of second strip sub-electrode of the second electrode in each of the plurality of light-modulating zones are alternately spaced apart, and the plurality of second strip sub-electrodes of the second electrode in all of the plurality of light-modulating zones is connected as an integral structure.

In some optional embodiments, the first electrode and the second electrode are located on a same side of the polymer dispersed liquid crystal layer, the first electrode is more proximate to the polymer dispersed liquid crystal layer than the second electrode, and the second electrode in all of the plurality of light-modulating zones is of a one-piece planar structure.

In some optional embodiments, the first electrode and the second electrode are respectively located on two sides of the polymer dispersed liquid crystal layer, the first electrode in each of the plurality of light-modulating zones is of a block structure, and the second electrode in all of the plurality of light-modulating zones is of a one-piece planar structure.

In some optional embodiments, the light-modulating element further includes a diffusion layer located between the first substrate and the second substrate and located on a light-exiting side of the polymer dispersed liquid crystal layer, and the diffusion layer includes diffusing particles.

In some optional embodiments, the light-modulating element further includes a plurality of scanning signal lines extending along a row direction and a plurality of data signal lines extending along a column direction, and the plurality of light-modulating zones is defined by the plurality of scanning signal lines and the plurality of data signal lines that are intersected.

In some optional embodiments, the light-modulating element is further provided with a thin-film transistor in each of the plurality of light-modulating zones. Gate electrodes of thin-film transistors located in light-modulating zones in a same row are connected to a same scanning signal line, source electrodes of thin-film transistors located in light-modulating zones in a same column are connected to a same data signal line, and a drain electrode of a thin-film transistor in each of the plurality of light-modulating zones is connected to a first electrode in the each of the plurality of light-modulating zones.

In a second aspect, an embodiment of the present disclosure further provides a backlight module, including a light guide plate and the light-modulating element according to the first aspect. The light-modulating element is located on a side of a light-exiting surface of the light guide plate.

In some optional embodiments, the backlight module further includes a light source, the light guide plate further includes a side surface and a bottom surface opposite to the light-exiting surface, and the light source is arranged on the side surface of the light guide plate.

In a third aspect, an embodiment of the present disclosure further provides a display device, including the backlight module according to the second aspect, and a display panel located on a light-exiting side of the backlight module.

In some optional embodiments, the display device further includes a driving circuit configured to drive the liquid crystal display panel and the light-modulating element.

In a fourth aspect, an embodiment of the present disclosure further provides a method for controlling the display device according to the third aspect. The method includes: in a high dynamic range HDR image display mode, acquiring initial image information;

determining display signals corresponding to sub-pixels in the display panel and voltage signals corresponding to the plurality of light-modulating zones in the light-modulating element of the backlight module, according to the initial image information; and inputting the display signals to the sub-pixels in the display panel, and inputting the voltage signals to the first electrodes corresponding to the plurality of light-modulating zones in the light-modulating element of the backlight module, where voltage values of the voltage signals inputted to the first electrodes corresponding to the plurality of light-modulating zones are at least partially different.

In some optional embodiments, the method for controlling the display device further includes:

determining whether to enter the HDR image display mode, after receiving a trigger signal for entering a display mode;

entering the HDR image display mode if it is determined to enter the HDR image display mode; and entering a general image display mode if it is determined not to enter the HDR image display mode.

In some optional embodiments, in the general image display mode the method includes: acquiring initial image information, transmitting the initial image information to the display panel for display, and controlling voltage values of voltage signals inputted to the first electrodes in the plurality of light-modulating zones of the light-modulating element to be the same.

In some optional embodiments, the determining the display signal corresponding to each sub-pixel in the display panel includes: compensating for a gray scale corresponding to each of the sub-pixels in the display panel, and determining the display signals corresponding to the sub-pixels after compensation.

BRIEF DESCRIPTION OF THE DRAWINGS

In order to illustrate the technical solutions of the present disclosure or the related technology in a clearer manner, the drawings desired for the present disclosure or the related technology will be briefly described hereinafter. Obviously, the following drawings merely relate to some optional embodiments of the present disclosure. Based on these drawings, a person skilled in the art may obtain the other drawings without creative effort.

REFERENCE NUMBERS

Figure 1:
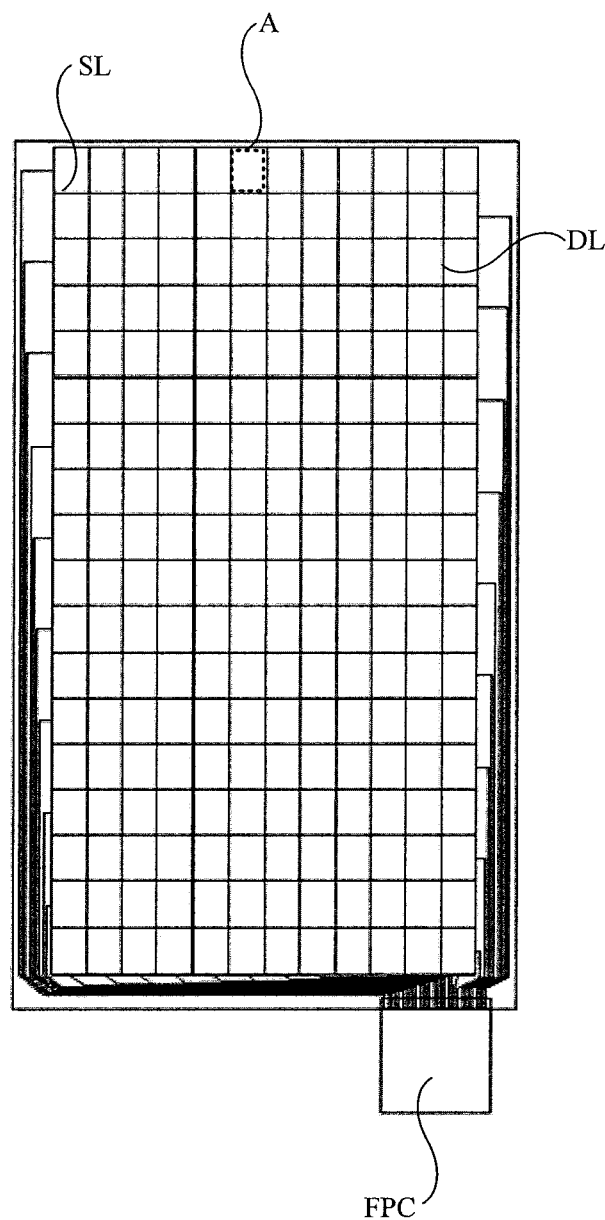
FIG. 1 is a schematic view showing a planar structure of a light-modulating element according to an embodiment of the present disclosure.

01: light-modulating element; 10: first substrate; 20: second substrate; 30: polymer dispersed liquid crystal layer; 40: diffusion layer; 101: first electrode; 102: second electrode; 1011: first strip sub-electrode; 1021: second strip sub-electrode; A: light-modulating zone; SL: scan signal line; DL: data signal line.

DETAILED DESCRIPTION

The technical solutions in the embodiments of the present disclosure will be described hereinafter in conjunction with the drawings in the embodiments of the present disclosure in a clear and complete manner. Obviously, the following embodiments merely relate to a part of, rather than all of, the embodiments of the present disclosure. Based on these embodiments, a person skilled in the art may, without creative effort, obtain the other embodiments, which shall also fall within the scope of the present disclosure.

Unless otherwise defined, technical terms or scientific terms used in the embodiments herein have the normal meaning commonly understood by one skilled in the art in the field of the present disclosure. The words "first", "second", and the like used in the embodiments of the present disclosure do not denote any order, quantity, or importance, but rather merely serves to distinguish different components. The "including", "comprising", and the like used in the present disclosure means that the element or item appeared in front of the word encompasses the element or item and their equivalents listed after the word, and does exclude other elements or items. The word "connected" or "connecting" and the like are not limited to physical or mechanical connections, but may include electrical connections, whether direct or indirect. The terms "on", "under", "left", "right" and the like are only used to represent relative positional relationships, and when the absolute position of the described object is changed, the relative positional relationship may also be changed, accordingly.

The HDR liquid crystal display (LCD) in the related art generally uses a backlight module (BLU) of a direct-lit architecture, configured to adjust the contrast between brightness and darkness in different local regions (referred to as local dimming technology) by controlling the brightness of each light-emitting diode (LED) in different regions of the BLU, to enhance the contrast between the darkest and brightest regions of the image (i.e., achieving a high gray scale contrast), thereby realizing a high dynamic contrast of the LCD and achieving the goal of enriching image hierarchy.

For small-sized LCD (such as a screen of a mobile phone or a tablet computer), if the contrasts between brightness and darkness in different local regions are adjusted by controlling the brightness of the LEDs in the BLU as described above, it is necessary to set a large number of LEDs in the BLU, its package structure is complex, and the thickness of the BLU of the direct-lit architecture is relatively large, which is difficult to meet the needs of small-sized LCD.

Embodiments of the present disclosure provides a light-modulating element, a backlight module, a display device and a method for driving the same, which can obtain a light and thin light-modulating element, and a backlight module having a simple structure and a low thickness, thereby better satisfying the need for a small-sized LCD with HDR image display.

Figure 2:
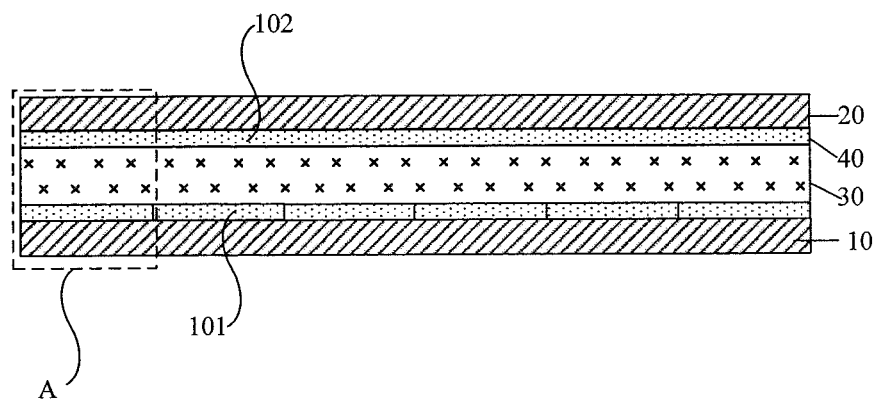
FIG. 2 is a schematic view showing a cross-sectional structure according to an embodiment of the present disclosure.

A light-modulating element is provided according to an embodiment of the present disclosure. As shown in FIG. 1 and FIG. 2, the light-modulating element 01 includes: a first substrate 10 and a second substrate 20 arranged opposite to each other, and a polymer dispersed liquid crystal layer 30 between the first substrate 10 and the second substrate 20.

Referring to FIG. 1, the light-modulating element 01 is divided into a plurality of light-modulating zones A. Referring to FIG. 2, the light-modulating element 01 further includes: a first electrode 101 and a second electrode 102 located in each light-modulating zone A, and the first electrodes 101 located in the different light-modulating zones A are independently arranged, so that the polymer dispersed liquid crystal (PDLC) molecules in the polymer dispersed liquid crystal layer 30 are driven by the first electrode 101 and the second electrode 102, to control light transmittance of each light-modulating zone A.

In some optional embodiments, the light-modulating element is shown in FIG. 1, the light-modulating element 01 further includes a plurality of scanning signal lines SL extending along the row direction and a plurality of data signal lines DL extending along the column direction, and the foregoing light-modulating zones A are defined by the intersected signal lines SL and data signal lines DL. It can be understood that the "row direction" and the "column direction" are a pair of relative directions, in which the row direction does not necessarily mean the horizontal direction, and the column direction does not necessarily mean the vertical direction. FIG. 1 only schematically shows the extending direction of the scanning signal line SL and the data signal line DL. In practice, the row direction and the column direction may be specifically selected according to the needs of light-modulating.

In some optional embodiments, the light-modulating element 01 is further provided with a thin-film transistor (TFT) in each of the plurality of light-modulating zones A; gate electrodes of thin-film transistors located in light-modulating zones A in a same row are connected to a same scanning signal line SL, and source electrodes of thin-film transistors located in light-modulating zones A in a same column are connected to a same data signal line DL; and a drain electrode of a thin-film transistor in each of the plurality of light-modulating zones A is connected to a first electrode 101 in the each of the plurality of light-modulating zones A.

In some optional embodiments, the liquid crystal, the polymer and the photoinitiator crosslinking agent are mixed in a certain proportion to form the polymer dispersed liquid crystal layer 30, and an electric field may be formed in the polymer dispersed liquid crystal layer 30 by energizing the first electrode 101 and the second electrode 102, to modulate refracting states of liquid crystal droplets in the polymer dispersed liquid crystal layer, so as to modulate incident light.

Figure 3:
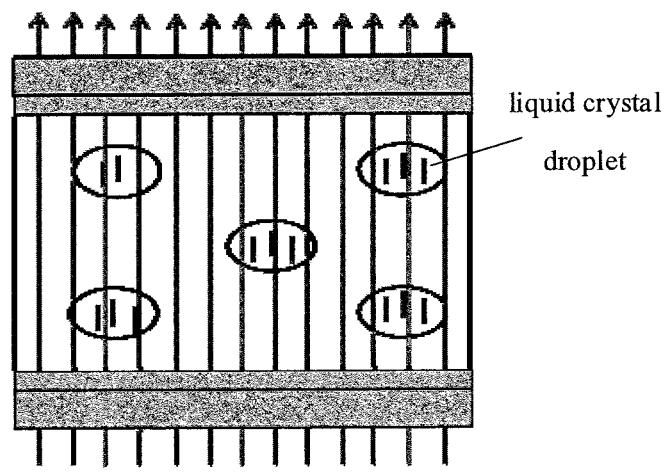
FIG. 3 is a schematic view showing a light-modulating principle of a light-modulating element under an applied electric field according to an embodiment of the present disclosure.
Figure 4:
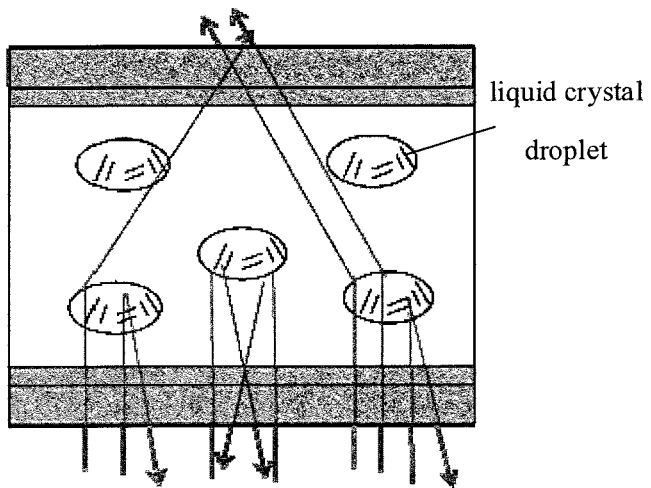
FIG. 4 is a schematic view showing a light-modulating principle of a light-modulating element without an applied electric field according to an embodiment of the present disclosure.

As schematically shown in FIG. 3, when an external electric field is applied, optical axis orientations of the liquid crystal droplets are basically parallel to a direction of the electric field, most of the incident light passes through, the macroscopic appearance of the polymer dispersed liquid crystal layer is a transparent state, and in this state, the polymer dispersed liquid crystal layer has the highest transmittance. As shown in FIG. 4, when the external electric field is not applied, the distribution of the optical axis orientations of the liquid crystal droplets is relatively random and disordered, most of the incident light is scattered or diffused on the surface of the liquid crystal droplets, the macroscopic appearance of the polymer dispersed liquid crystal layer is an opaque mist state, and in this state, the polymer dispersed liquid crystal layer has the lowest transmittance. Thus, in practice, the transmittance of the polymer dispersed liquid crystal layer in the respective light-modulating zones A is controlled by changing a magnitude of the external electric field strength.

In some optional embodiments, the polymer dispersed liquid crystal is typically encapsulated by a packaging adhesive in a peripheral region (i.e., a non-effective light-modulating zone) of the first substrate 10 and the second substrate 20.

In some optional embodiments, at least one of the first substrate 10 or the second substrate 20 employs a flexible film. For example, in some optional embodiments, the first substrate 10 is a polyimide film (PI film); in some optional embodiments, the second substrate 20 uses a PI film; in some optional embodiments, the first substrate 10 and the second substrate 20 both use a PI film.

The first electrode 101 described above may be used as a light-modulating electrode for modulating light incident into the liquid crystals, and is independently arranged in each of the light-modulating zones A. The second electrode 102 may be used as a common electrode; the second electrodes in all the light-modulating zones A may be connected as an integral structure; or the second electrodes may be separately provided for different light-modulating zones A, which is not specifically limited in the present disclosure. In practical applications, the second electrodes in all the light-modulating zones A may be generally connected as an integral structure, or may be of a one-piece structure as a whole.

In addition, for the first electrode 101 and the second electrode 102, a vertical electric field may be formed therebetween to drive the polymer dispersed liquid crystals in the polymer dispersed liquid crystal layer; or a horizontal electric field may be formed to drive the polymer dispersed liquid crystals in the polymer dispersed liquid crystal layer, which is not specifically limited in the present disclosure. Illustratively, some specific arrangements of the first electrode 101 and the second electrode 102 are provided below.

In some optional embodiments, as shown in FIG. 2, the first electrode 101 and the second electrode 102 may be located on both sides of the polymer dispersed liquid crystal layer 30. The first electrode 101 includes a plurality of discrete block structures, and the second electrode 102 is an integral planar electrode. In each of the light-modulating zones A, the first electrode 101 is of a block structure (that is, the first electrodes of the block structure are separately provided in the respective light-modulating zones). The second electrodes 102 in all the light-modulating zones are connected as an integral planar structure, that is, the second electrodes 102 in all the light-modulating zones are integrally constitutes an integral planar electrode in the effective light-modulating zone (which may correspond to the effective display region of the display device). In this case, a vertical electric field may be formed by energizing the first electrode 101 and the second electrode 102, to drive the polymer dispersed liquid crystals in the polymer dispersed liquid crystal layer. Optionally, the first electrodes 101 in the plurality of light-modulating zones A are individually energized. Specifically, the first electrodes 101 in the respective light-modulating zones A are respectively connected to control signal lines, to be individually energized, thereby individually modulating light transmittances in respective light-modulating zones A of the light-modulating element.

Figure 5:
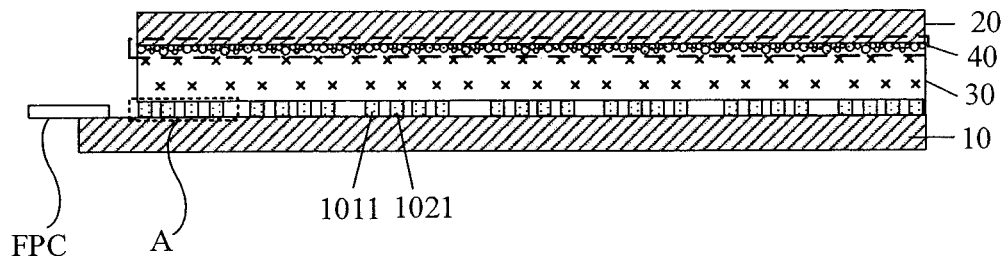
FIG. 5 is a schematic view showing a structure of a light-modulating element according to an embodiment of the present disclosure.
Figure 6:
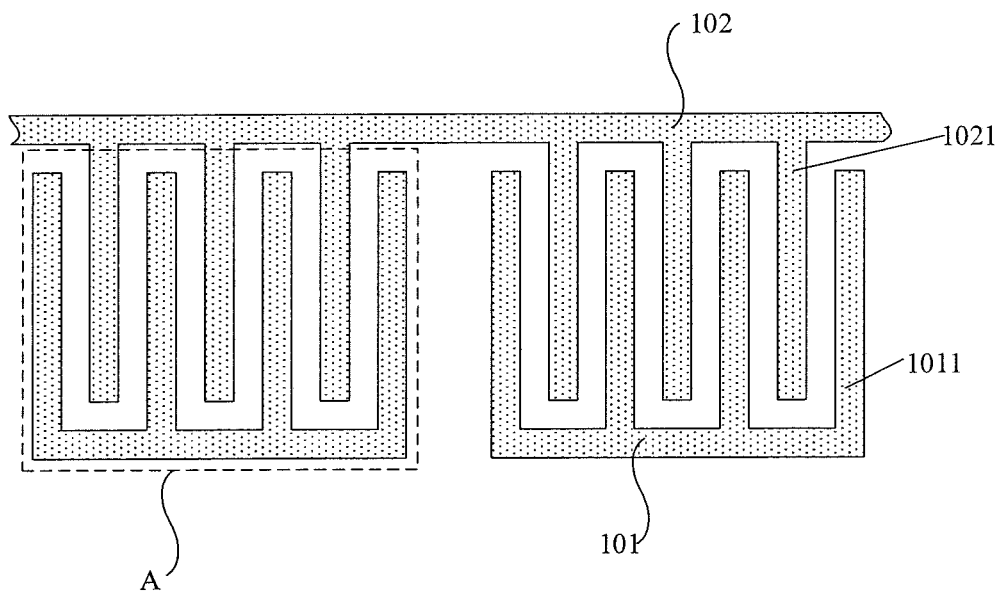
FIG. 6 is a schematic view showing an electrode distribution of a light-modulating element according to an embodiment of the present disclosure.

In some optional embodiments, as shown in FIG. 5 and FIG. 6, the first electrode 101 and the second electrode 102 may be located on the same side of the polymer dispersed liquid crystal layer 30. The first electrode 101 includes a plurality of first strip sub-electrodes 1011, and the second electrode 102 includes a plurality of second strip sub-electrodes 1021. The first strip sub-electrodes 1011 and the second strip sub-electrodes 1021 are made of a same material and arranged in a same layer. The first electrode 101 and the second electrode 102 are prepared from the same material by the same manufacturing process, thereby simplifying the production process and further reducing the production cost. In each light-modulating zone A, the first strip sub-electrodes 1011 of the first electrode 101 and the second strip sub-electrodes 1021 of the second electrode 102 are alternately spaced apart. In this case, a horizontal electric field may be formed by energizing the first electrode 101 and the second electrode 102, to drive the polymer dispersed liquid crystals in the polymer dispersed liquid crystal layer.

Figure 7:
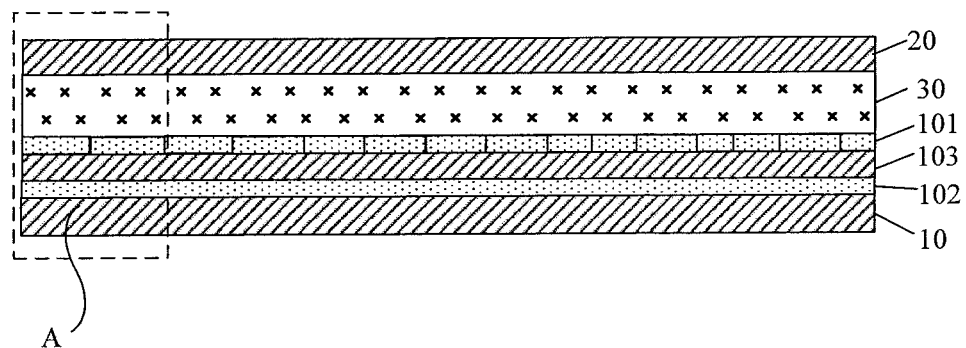
FIG. 7 is a schematic view showing an electrode distribution of a light-modulating element according to another embodiment of the present disclosure.

In some optional embodiments, as shown in FIG. 7, the first electrode 101 and the second electrode 102 may be located on the same side of the polymer dispersed liquid crystal layer 30, and the first electrode 101 and the second electrode 102 are located in different layers. The first electrode 101 is more proximate to the polymer dispersed liquid crystal layer 30 than the second electrode 102. In each of the plurality of light-modulating zones A, the first electrode 101 includes a plurality of strip sub-electrodes; and a plurality of second electrodes 102 in all of the plurality of light-modulating zones A is connected as an integral planar structure, that is, the plurality of second electrodes in all of the light-modulating zones integrally forms an integral planar electrode in the effective light-modulating zone. It can be understood that, in this case, an electric field may be formed by the first electrode 101 and the second electrode 102, to drive the polymer dispersed liquid crystal in the polymer dispersed liquid crystal layer.

Optionally, the first electrode 101 and the second electrode 102 may use a transparent electrode to reduce the unnecessary influence of the first electrode 101 and the second electrode 102 on the transmittance of the light-modulating element. For example, the first electrode 101 and the second electrode 102 may be made of Indium Tin Oxide (ITO), Indium Gallium Zinc Oxide (IGZO), Indium Zinc Oxide (IZO), and other transparent conductive materials.

In view of the above, when the light-modulating element of the present disclosure is applied to the backlight module, the transmittance of each light-modulating zone is controlled by adjusting the voltages supplied to the first electrode and the second electrode, to adjust contrasts between brightness and darkness of the backlight module in corresponding light-modulating zones, thereby achieving HDR image display. As compared with the related art, in which the brightness and darkness in different regions is realized by directly adjusting the brightness of the LEDs in different regions of the direct-lit backlight module, the backlight module according to the embodiments of the present disclosure does not need to include multiple LEDs, has a simple structure and a relatively low thickness, is easy to be packaged, and thus it is convenient for small size LCDs to achieve HDR image display function based on the backlight module according to the embodiments of the present disclosure. It can be understood that when the light-modulating element of the present disclosure is applied to the backlight module, it can be applied to the direct-lit backlight module or the edge-lit backlight module, thereby expanding the application range of the HDR display. Especially for small-sized display devices, the direct-lit backlight module has a large thickness and requires a large number of LEDs to be provided in the HDR display, so that the direct-lit backlight module is difficult to meet the demand; in contrast, the light-modulating element in the present disclosure can be directly applied to the edge-lit backlight module, thereby realizing the HDR display of the small-sized display device.

On this basis, in order to improve the light uniformity of the light-modulating element 01 in each light-modulating zone A, in some optional embodiments of the present disclosure, as shown in FIG. 5, the light-modulating element 01 further includes: a diffusion layer 40 located between the first substrate 10 and the second substrate 20 and located on the light-exiting side of the polymer dispersed liquid crystal layer 30, and the diffusion layer 40 is mainly composed of diffusing particles. In such a structure, when the light passes through light-modulating zones A and enters the diffusion layer, the light are scattered by the diffusion layer 40, thereby improving the light uniformity of each light-modulating zone. The diffusion layer 40 functions as atomization, and reach the effect of masking flaws.

A backlight module is further provided according to an embodiment of the present disclosure, which includes a light source, a light guide plate, and the light-modulating element 01 as described above, and the light-modulating element is located on a side of the light guide plate where the light-exiting surface of the light guide plate is.

Figure 8:
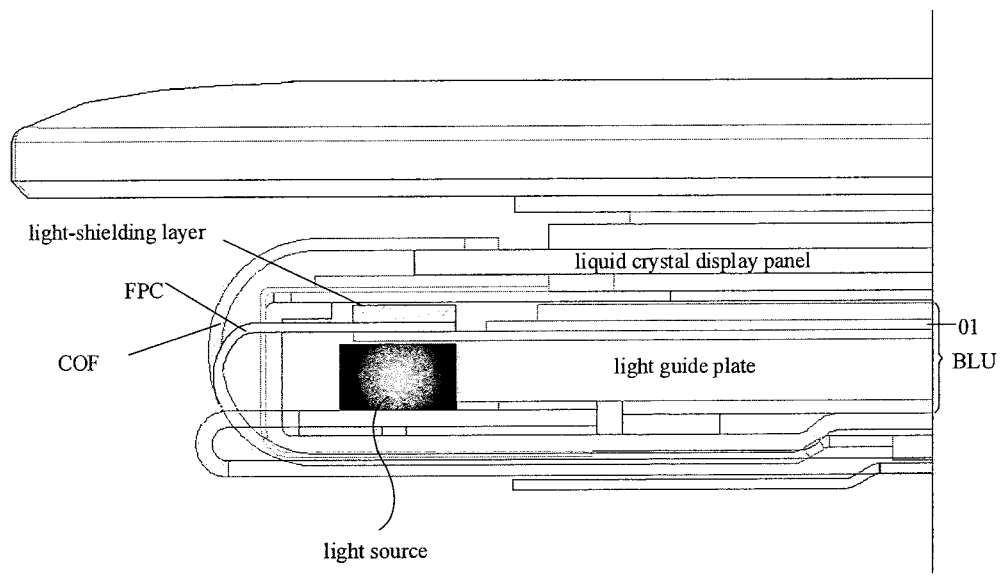
FIG. 8 is a schematic view showing a structure of a display device including a backlight module according to an embodiment of the present disclosure.

In some embodiments, as shown in FIG. 8, the backlight module in the present disclosure may be an edge-lit backlight module. The light guide plate further includes a side surface, and a bottom surface opposite to the light-exiting surface, and the light source is arranged at the side surface of the light guide plate.

In some optional embodiments, as shown in FIG. 8, the backlight module further includes: a light-shielding layer located on a side of the light source proximate to the light-exiting surface. Specifically, the light-shielding layer includes a black rubber strip, to prevent strong light at the light source from adversely affecting the display.

Of course, the backlight module further includes other optical film layers, for example, a diffusion film, a prism layer, which will not be further described herein.

Figure 9:
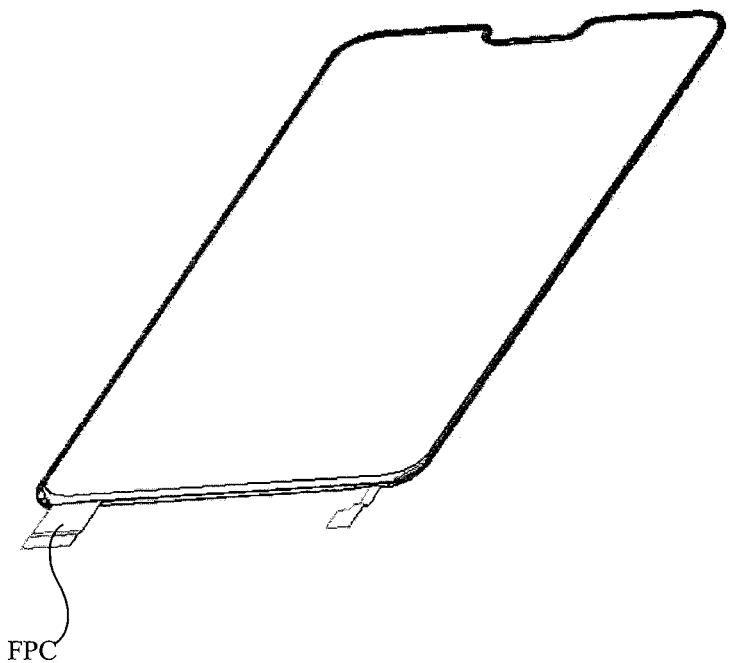
FIG. 9 is a schematic view showing a structure of a backlight module according to an embodiment of the present disclosure.

As schematically shown in FIG. 9, the edge-lit backlight module may be a backlight module in a mobile phone.

In some optional embodiments, the backlight module in the present disclosure may be a direct-lit backlight module; in which a plurality of light sources is located directly under the light guide plate and arranged in an array; of course, as for the direct-lit backlight module, the above-mentioned light guide plate may also be referred to as a diffusion plate. Of course, in this case, the backlight module further includes other optical film layers, e.g., a brightness enhancement film, a reflective film, and the like, which will not be further described herein.

Since the backlight module in this embodiment includes the foregoing light-modulating element, it has the same structures and advantageous effects as the light-modulating element provided in the foregoing embodiments. Since the structures and beneficial effects of the light-modulating element have been described in detail in the foregoing embodiments, they will not be described herein.

In addition, as for the other related content in the backlight module, reference may be made to the corresponding part in the embodiments of the foregoing light-modulating element, which will not be described herein; and as for other arrangement structures in the embodiments of the foregoing light-modulating element, reference may be made to the above backlight module, which will not be described herein.

A display device is further provided according to an embodiment of the present disclosure. As shown in FIG. 8 (taking an edge-lit backlight module as an example), the display device includes the above-mentioned backlight module, and a liquid crystal display panel located on a light-exiting side of the backlight module.

It can be understood that the display device generally includes a plastic frame, a back plate, a rubber strip, a package cover, and the like, which will not be described herein and can be provided according to related technology as needed.

It should be noted that, in an embodiment of the present disclosure, the display device may be any product or component having a display function, such as a liquid crystal display, an electronic paper, a mobile phone, a tablet computer, a television, a notebook computer, a digital photo frame, a navigator, and the like.

In some optional embodiments, the display device includes a driver circuit (Driver IC) configured to drive the liquid crystal display panel for display.

In addition, for the light-modulating element 01, inevitably, it is also necessary to design an integrated circuit (IC) to drive and control the light-modulating element 01. In practical applications, a light strength of the light exiting from the local backlight module may be effectively adjusted by arranging the relative small number of the light-modulating zones A in the light-modulating element 01, for example, 30×40 light-modulating zones A. It should be noted that the number of the light-modulating zones A in the light-modulating element 01 may be designed according to actual requirements, which may be more or less than 30×40. A driving mode of the light-modulating element 01 is basically the same as that of the liquid crystal display panel. Therefore, in some optional embodiments, the driving circuit of the liquid crystal display panel can be compatible with the IC that controls the light-modulating element, for example, the liquid crystal display panel and the light-modulating element may be driven by one IC in a time division manner.

In some optional embodiments, the light-modulating element can be driven to perform local backlight adjustment by a driving circuit in a certain period; one or more rows of sub-pixels in the liquid crystal display panel is driven for display in the next period; the light-modulating element is driven continuously for local backlight adjustment in the further next period, another row or the other rows of sub-pixels in the liquid crystal display panel is driven continuously for display in the further next period; and so on, thereby realizing the display of the HDR image.

In this case, as shown in FIG. 1, it is not necessary to separately provide a gate driver on array (GOA) in the light-modulating element 01, leads (including the scanning signal line leads and the data signal line leads) may be directly arranged in a wiring area around the periphery of the light-modulating element 01 and be bound to the bonding area. Of course, in order to narrow the bezel, as shown in FIG. 1, the scanning signal line leads connected to the odd-numbered scanning signal lines are arranged in the wiring area on one side of the light-modulating element, and the scanning signal line leads connected to the even-numbered scanning signal lines are arranged in the wiring area on the other side of the light-modulating element.

On this basis, in some optional embodiments, as shown in FIG. 9, chip on film (COF) technology may be used to fix the driving circuit onto the flexible circuit board. In this case, as shown in FIGS. 1, 8 and 9, a flexible printed circuit (FPC) can be bound to the light-modulating element 01 and the COF, thereby driving a liquid crystal display panel and a light-modulating element by one driving circuit in a time division manner.

Figure 10:
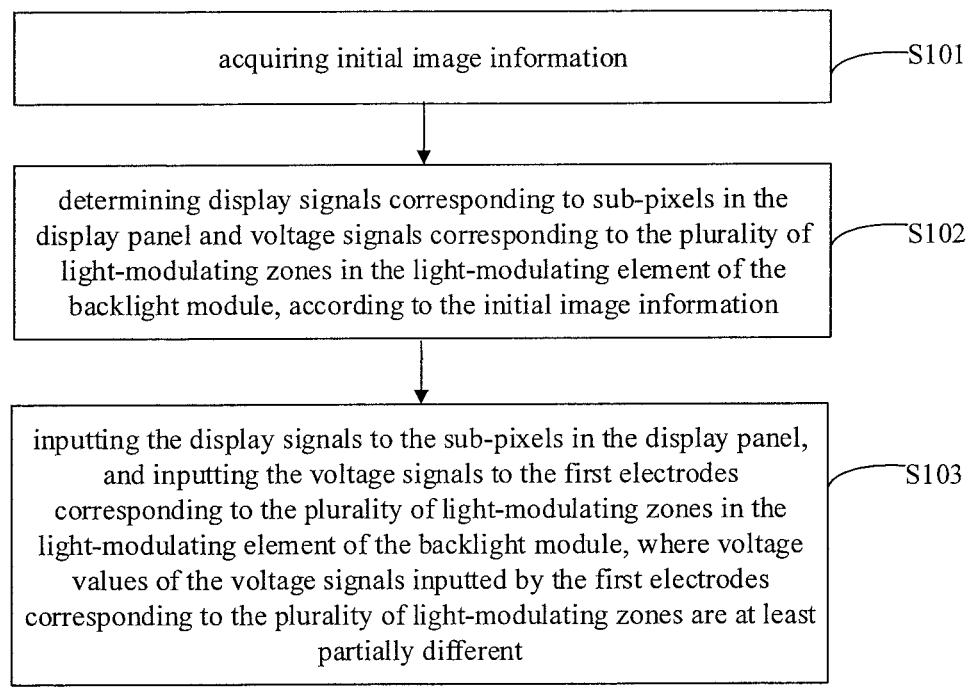
FIG. 10 is a schematic view showing a flowchart of a method for controlling a display device according to an embodiment of the present disclosure.

Embodiments of the present disclosure further provide a method for controlling the foregoing display device. As shown in FIG. 10, the method for controlling the display device includes: in an HDR image display mode, step S101, acquiring initial image information;

step S102, determining display signals corresponding to sub-pixels in the display panel and voltage signals corresponding to the plurality of light-modulating zones in the light-modulating element of the backlight module, according to the initial image information; and step S103, inputting the display signals to the sub-pixels in the display panel, and inputting the voltage signals to the first electrodes corresponding to the plurality of light-modulating zones in the light-modulating element of the backlight module, where voltage values of the voltage signals inputted by the first electrodes corresponding to the plurality of light-modulating zones are at least partially different.

Figure 11:
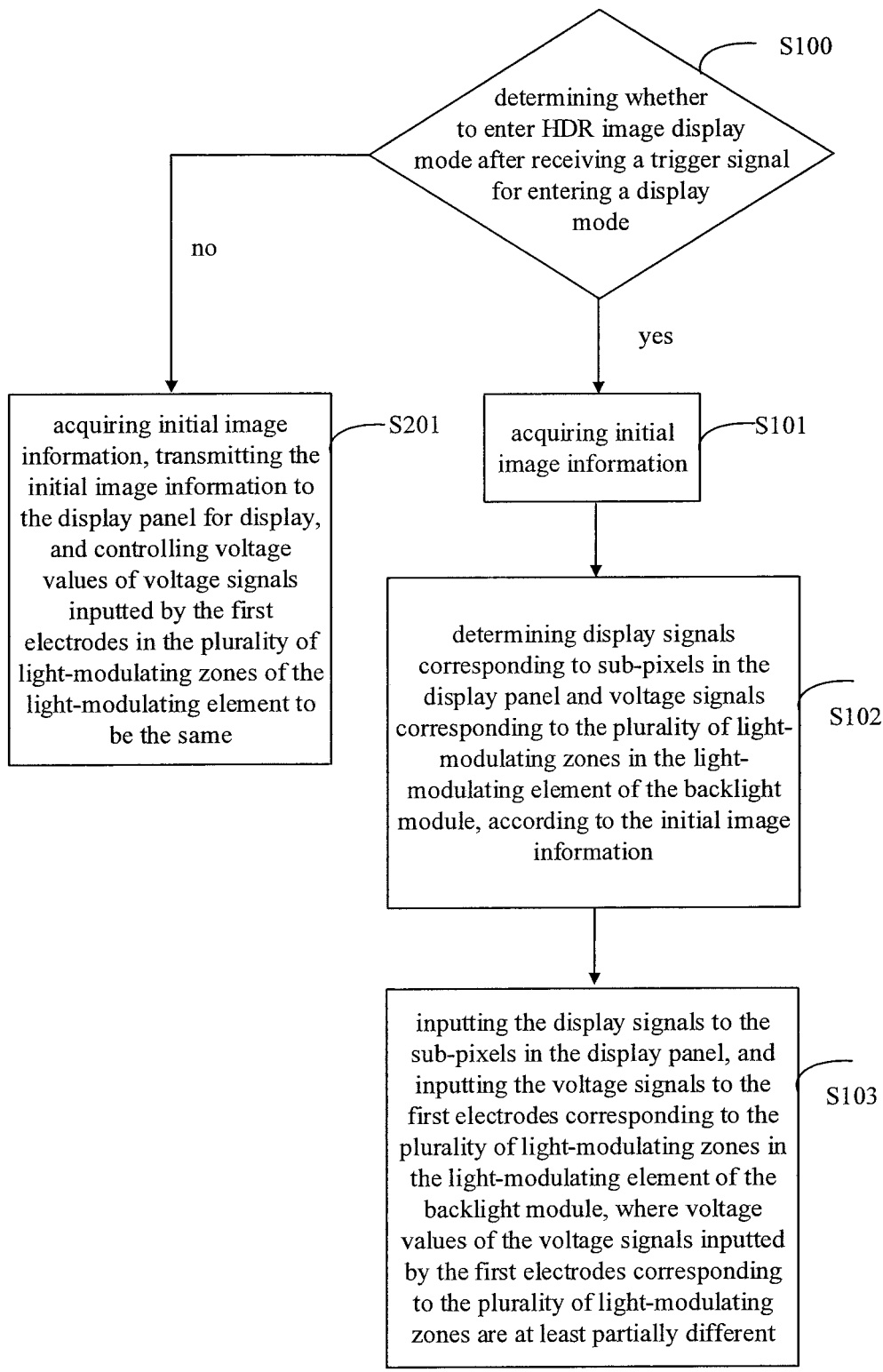
FIG. 11 is a schematic view showing a flowchart of a method for controlling a display device according to another embodiment of the present disclosure.

In some optional embodiments, as shown in FIG. 11, the method for controlling the display device further includes: step S100, determining whether to enter the HDR image display mode, after receiving a trigger signal for entering a display mode; if yes, entering the HDR image display mode, that is, performing the foregoing steps S101 to S103; and if no, entering a general image display mode.

In some optional embodiments, in the general image display mode, the controlling method includes: acquiring initial image information, transmitting the initial image information to the display panel for display, and controlling voltage values of voltage signals inputted by the first electrodes in the plurality of light-modulating zones of the light-modulating element to be the same.

In some optional embodiments, the determining the display signal corresponding to each sub-pixel in the display panel includes: compensating for a gray scale corresponding to each of the sub-pixels in the display panel, and determining the display signals corresponding to the sub-pixels after compensation.

Of course, as for other related content in the control method, reference may be made to the corresponding parts in the embodiments of the foregoing light-modulating element, the backlight module, and the display device, which will not be described herein. As for other devices in the embodiments of the foregoing light-modulating element, the backlight module, and the display device, the related control may be performed by referring to the above control method, which will not be described herein.

A person of ordinary skill in the art can understand that all or part of processes of implementing the above method embodiments can be completed by a computer program instructing related hardware, the program can be stored in a computer readable storage medium, and when the program is executed, the processes of the above method embodiments can be implemented. The storage medium may be a magnetic disk, an optical disk, a read-only memory (ROM), a random access memory (RAM), or the like.

The above description is merely the specific embodiment of the present disclosure, but the scope of the present disclosure is not limited thereto. Moreover, any person skilled in the art would readily conceive of modifications or substitutions within the technical scope of the present disclosure, and these modifications or substitutions shall also fall within the protection scope of the present disclosure.

Therefore, the protection scope of the present disclosure should be determined by the scope of the claims.

What is claimed is:

1. A light-modulating element, comprising a first substrate and a second substrate arranged opposite to each other, and a polymer dispersed liquid crystal layer located between the first substrate and the second substrate,
    wherein the light-modulating element is divided into a plurality of light-modulating zones;
    the light-modulating element further comprises a first electrode and a second electrode located in each of the plurality of light-modulating zones, and a plurality of first electrodes located in different light-modulating zones are independently arranged; and
    the first electrode and the second electrode are configured to drive a deflection of polymer dispersed liquid crystal molecules in the polymer dispersed liquid crystal layer,
    wherein the light-modulating element further comprises: a diffusion layer located between the first substrate and the second substrate and located on a light-exiting side of the polymer dispersed liquid crystal layer, and the diffusion layer directly contacts the polymer dispersed liquid crystal layer,
    wherein the diffusion layer comprises diffusing particles.

2. The light-modulating element according to claim 1, wherein each of the first substrate and the second substrate is made of polyimide PI.

3. The light-modulating element according to claim 1, further comprising a plurality of scanning signal lines extending along a row direction and a plurality of data signal lines extending along a column direction,
    wherein the plurality of light-modulating zones is defined by the plurality of scanning signal lines and the plurality of data signal lines that are intersected.

4. The light-modulating element according to claim 3, wherein
    the light-modulating element is further provided with a thin-film transistor in each of the plurality of light-modulating zones; and
    gate electrodes of thin-film transistors located in light-modulating zones in a same row are connected to a same scanning signal line, and source electrodes of thin-film transistors located in light-modulating zones in a same column are connected to a same data signal line, and a drain electrode of a thin-film transistor in each of the plurality of light-modulating zones is connected to the first electrode in the each of the plurality of light-modulating zones.

5. The light-modulating element according to claim 1, wherein
    the first electrode comprises a plurality of first strip sub-electrodes, and the second electrode comprises a plurality of second strip sub-electrodes, the plurality of first strip sub-electrodes and the plurality of second strip sub-electrodes are made of a same material and arranged in a same layer, a plurality of first strip sub-electrode of the first electrode and a plurality of second strip sub-electrode of the second electrode in each of the plurality of light-modulating zones are alternately spaced apart, and the plurality of second strip sub-electrodes of the second electrode in all of the plurality of light-modulating zones is connected as an integral structure; or
    the first electrode and the second electrode are located on a same side of the polymer dispersed liquid crystal layer, the first electrode is more proximate to the polymer dispersed liquid crystal layer than the second electrode, and the second electrode in all of the plurality of light-modulating zones is of a one-piece planar structure; or
    the first electrode and the second electrode are respectively located on two sides of the polymer dispersed liquid crystal layer, the first electrode in each of the plurality of light-modulating zones is of a block structure, and the second electrode in all of the plurality of light-modulating zones is of a one-piece planar structure.

6. The light-modulating element according to claim 1, wherein the diffusion layer is mainly composed of diffusing particles.

7. The light-modulating element according to claim 1, wherein the diffusion layer is composed of diffusing particles.

8. A backlight module, comprising a light guide plate and a light-modulating element, wherein the light-modulating element is located on a side of a light-exiting surface of the light guide plate;
    the light-modulating element comprises a first substrate and a second substrate arranged opposite to each other, and a polymer dispersed liquid crystal layer located between the first substrate and the second substrate;
    the light-modulating element is divided into a plurality of light-modulating zones;
    the light-modulating element further comprises a first electrode and a second electrode located in each of the plurality of light-modulating zones, and a plurality of first electrodes located in different light-modulating zones are independently arranged; and
    the first electrode and the second electrode are configured to drive a deflection of polymer dispersed liquid crystal molecules in the polymer dispersed liquid crystal layer,
    wherein the light-modulating element further comprises: a diffusion layer located between the first substrate and the second substrate and located on a light-exiting side of the polymer dispersed liquid crystal layer, and the diffusion layer directly contacts the polymer dispersed liquid crystal layer,
    wherein the diffusion layer comprises diffusing particles.

9. The backlight module according to claim 8, further comprising a light source, wherein
    the light guide plate further comprises a side surface and a bottom surface opposite to the light-exiting surface, and the light source is arranged on the side surface of the light guide plate.

10. The backlight module according to claim 8, further comprising a light-shielding layer, wherein the light-shielding layer is located on a side of the light source proximate to the light-exiting surface.

11. The backlight module according to claim 8, wherein the first substrate and the second substrate are both made of polyimide PI.

12. The backlight module according to claim 8, wherein the light-modulating element further comprises a diffusion layer located between the first substrate and the second substrate and located on a light-exiting side of the polymer dispersed liquid crystal layer,
    wherein the diffusion layer comprises diffusion particles.

13. The backlight module according to claim 8, wherein the light-modulating element further comprises a plurality of scanning signal lines extending along a row direction and a plurality of data signal lines extending along a column direction, and the plurality of light-modulating zones is defined by the plurality of scanning signal lines and the plurality of data signal lines that are intersected;

the light-modulating element is further provided with a thin-film transistor in each of the plurality of light-modulating zones, and gate electrodes of thin-film transistors located in light-modulating zones in a same row are connected to a same scanning signal line, and source electrodes of thin-film transistors located in light-modulating zones in a same column are connected to a same data signal line, and a drain electrode of a thin-film transistor in each of the plurality of light-modulating zones is connected to a first electrode in the each of the plurality of light-modulating zones.

14. A display device, comprising the backlight module according to claim 8, and a display panel located on a light-exiting side of the backlight module.

15. The display device according to claim 14, further comprising a driving circuit configured to drive the display panel and the light-modulating element.

16. A method for controlling the display device according to claim 14, comprising: in a high dynamic range HDR image display mode,
acquiring initial image information;
determining display signals corresponding to sub-pixels in the display panel and voltage signals corresponding to the plurality of light-modulating zones in the light-modulating element of the backlight module, according to the initial image information; and
inputting the display signals to the sub-pixels in the display panel, and inputting the voltage signals to the first electrodes corresponding to the plurality of light-modulating zones in the light-modulating element of the backlight module, wherein voltage values of the voltage signals inputted to the first electrodes corresponding to the plurality of light-modulating zones are at least partially different.

17. The method for controlling the display device according to claim 16, further comprising:
determining whether to enter the HDR image display mode, after receiving a trigger signal for entering a display mode;
entering the HDR image display mode if it is determined to enter the HDR image display mode; and
entering a general image display mode if it is determined not to enter the HDR image display mode.

18. The method for controlling the display device according to claim 17, wherein in the general image display mode, the method comprises:
acquiring initial image information, transmitting the initial image information to the display panel for display, and controlling voltage values of voltage signals inputted to the first electrodes in the plurality of light-modulating zones of the light-modulating element to be the same.

19. The method for controlling the display device according to claim 16, wherein the determining the display signals corresponding to the sub-pixels in the display panel comprises: compensating for a gray scale corresponding to each of the sub-pixels in the display panel, and determining the display signals corresponding to the sub-pixels after compensation.

20. The backlight module according to claim 8, wherein
the first electrode comprises a plurality of first strip sub-electrodes, and the second electrode comprises a plurality of second strip sub-electrodes, the plurality of first strip sub-electrodes and the plurality of second strip sub-electrodes are made of a same material and arranged in a same layer, a plurality of first strip sub-electrode of the first electrode and a plurality of second strip sub-electrode of the second electrode in each of the plurality of light-modulating zones are alternately spaced apart, and the plurality of second strip sub-electrodes of the second electrode in all of the plurality of light-modulating zones is connected as an integral structure; or the first electrode and the second electrode are located on a same side of the polymer dispersed liquid crystal layer, the first electrode is more proximate to the polymer dispersed liquid crystal layer than the second electrode, and the second electrode in all of the plurality of light-modulating zones is of a one-piece planar structure; or the first electrode and the second electrode are respectively located on two sides of the polymer dispersed liquid crystal layer, the first electrode in each of the plurality of light-modulating zones is of a block structure, and the second electrode in all of the plurality of light-modulating zones is of a one-piece planar structure.

* * * * *